US011518075B2

(12) United States Patent
Ochiai et al.

(10) Patent No.: US 11,518,075 B2
(45) Date of Patent: Dec. 6, 2022

(54) HOT RUNNER NOZZLE, INJECTION MOLDING APPARATUS AND MANUFACTURING METHOD OF RESIN MOLDED PRODUCT

(71) Applicant: CANON KABUSHIKI KAISHA, Tokyo (JP)

(72) Inventors: Takamichi Ochiai, Tokyo (JP); Shusuke Tobita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 17/199,724

(22) Filed: Mar. 12, 2021

(65) Prior Publication Data
US 2021/0299924 A1      Sep. 30, 2021

(30) Foreign Application Priority Data

Mar. 27, 2020   (JP) .............................. JP2020-058416

(51) Int. Cl.
*B29C 45/28*      (2006.01)
*B29C 45/27*      (2006.01)

(52) U.S. Cl.
CPC ...... *B29C 45/2806* (2013.01); *B29C 45/2737* (2013.01); *B29C 2045/2858* (2013.01)

(58) Field of Classification Search
CPC ............ B29C 45/2737; B29C 45/2806; B29C 2045/2858
See application file for complete search history.

(56) References Cited

FOREIGN PATENT DOCUMENTS

JP      8-332653 A      12/1996
JP      11-221840 A      8/1999

*Primary Examiner* — James Sanders
(74) *Attorney, Agent, or Firm* — Venable LLP

(57) ABSTRACT

A hot runner nozzle includes a nozzle body configured to define a flow path of molten resin, and a cover member arranged at a circumference of a tip portion of the nozzle body. The cover member includes a first engagement portion being arranged on a part of an outer periphery and configured to engage with a mold and/or a second engagement portion being arranged on a part of an inner periphery and configured to engage with the nozzle body.

11 Claims, 13 Drawing Sheets

J-J

I-I

K-K

HOT RUNNER NOZZLE, INJECTION MOLDING APPARATUS AND MANUFACTURING METHOD OF RESIN MOLDED PRODUCT

BACKGROUND OF THE INVENTION

Field of the Invention

The present invention relates to a hot runner nozzle used to perform injection molding of resin, an injection molding apparatus, and a manufacturing method of an injection molded product.

Description of the Related Art

A cold runner mold and a hot runner mold are known as molds for molding resin by performing injection molding of thermoplastic resin such as plastic. The cold runner mold has an advantage in that it has a simple structure, but since resin that had cured in a runner portion of the mold turns into waste material, the hot runner mold that creates less resin waster material is desirably used from the viewpoint of improving economic efficiency and reducing environmental load. By using a hot runner mold whose entire runner portion is heated, a resin molded product can be obtained while generating very little resin waste material.

One problem of using a hot runner mold for injection molding is the lowering of temperature at a tip portion of the hot runner nozzle. Generally, the tip portion of the hot runner nozzle must be in contact with the mold to position a nozzle tip hole to a mold gate hole, but heat conduction to the mold may cause the temperature at the tip portion of the hot runner nozzle to drop. Further, if a structure of forming a resin layer for insulating heat near the tip portion of the nozzle is adopted, a whole circumference of the area around the tip portion of the nozzle must fit to the mold in order to seal resin, so that the engagement portion may become a heat conduction path that leads to the mold.

If a temperature at the tip portion of the nozzle drops, the resin that had cured near the tip portion blocks injection of a subsequent shot, deteriorating molding stability. For example, in order to mold a resin such as polybutylene terephthalate that has a narrow temperature range for proper injection, even a small temperature drop may cause the resin to cure significantly near the tip of the nozzle. It is possible to raise the temperature of the entire nozzle so that the temperature of the tip portion of the nozzle will not drop below the curing temperature of resin, but there is a drawback in that areas other than the tip portion will be heated excessively, which causes resin to decompose and be unsuited for molding.

Japanese Patent Application Laid-Open Publication No. H11-221840 discloses a configuration where an outer layer formed of low heat conduction material is arranged up to a tip portion of a hot runner nozzle and a heater is arranged on the circumference of the outer layer to reach the tip portion of the nozzle.

Japanese Patent Application Laid-Open Publication No. H08-332653 discloses a configuration where a heat conduction suppressing member formed of a synthetic resin having heat resistance and low heat conduction is arranged between an outer circumference of a gate portion and a movable mold housing a hot runner. By providing the heat conduction suppressing member formed of synthetic resin, it becomes possible to suppress radiation of heat released from a contact portion of the tip portion of the nozzle with the mold and to suppress temperature drop at the tip of the nozzle.

However, the method proposed in Japanese Patent Application Laid-Open Publication No. H11-221840 is difficult to apply, for example, to a multicavity-type injection molding apparatus in which a plurality of hot runners are arranged highly densely or to an injection molding apparatus for molding small-sized product having a complex shape. In these injection molding apparatuses, only limited usable space is available in the circumference of the hot runner, and especially, it is not realistic to arrange a heater near the tip portion of the nozzle having an outer shape of a truncated cone with a taper.

The method proposed in Japanese Patent Application Laid-Open Publication No. H08-332653 can be expected to have a certain effect of suppressing temperature drop at the tip of the nozzle, but there are concerns related to durability and reliability. Actually, in a heat conduction suppressing member composed of synthetic resin, super engineering plastic resin such as polyetheretherketone is used. However, the use of such material may cause a part of the heat conduction suppressing member to be damaged by injection pressure or by pressing force of the hot runner nozzle during heat expansion, and there is a risk of resin leaking through the damaged portion and flowing into the mold.

Thus, there were demands for a hot runner nozzle that is capable of realizing positioning of the tip portion of the nozzle and the mold while suppressing temperature drop at the tip portion of the nozzle, and that has high durability and reliability.

SUMMARY OF THE INVENTION

According to an aspect of the present invention, a hot runner nozzle includes a nozzle body configured to define a flow path of molten resin, and a cover member arranged at a circumference of a tip portion of the nozzle body. The cover member includes a first engagement portion being arranged on a part of an outer periphery and configured to engage with a mold and/or a second engagement portion being arranged on a part of an inner periphery and configured to engage with the nozzle body.

Further features of the present invention will become apparent from the following description of exemplary embodiments with reference to the attached drawings.

DESCRIPTION OF THE EMBODIMENTS

A hot runner nozzle, an injection molding apparatus, and an injection molding method according to the present embodiment will now be described with reference to the drawings.

In the description of the embodiments described below and the accompanying drawings, unless stated otherwise, elements that are denoted with the same reference numbers have same or similar functions.

First Embodiment

Figure 1:
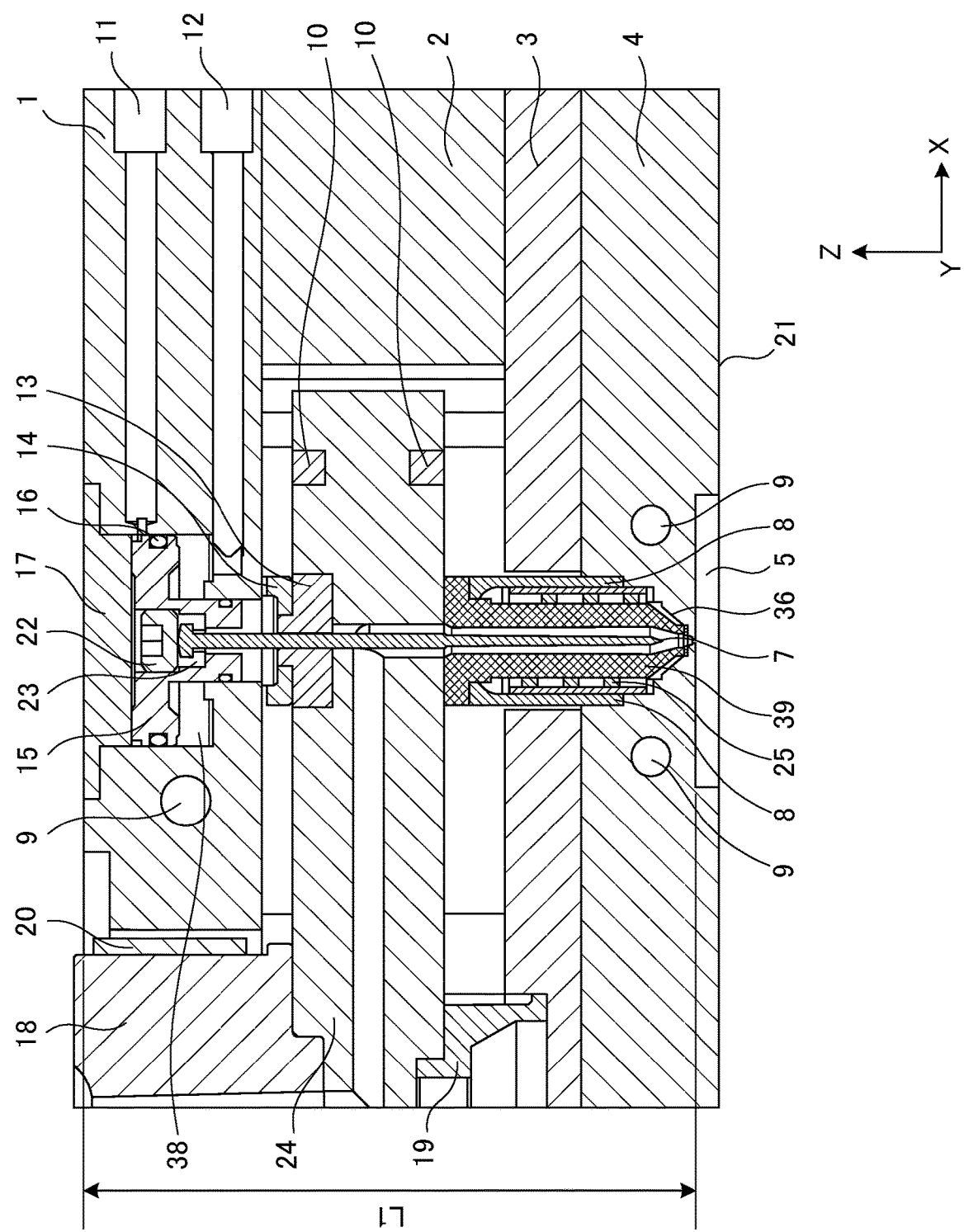
FIG. 1 is a schematic cross-sectional view illustrating a part of an injection molding apparatus according to a first embodiment.

FIG. 1 is a schematic cross-sectional view illustrating a part of an injection molding apparatus according to a first embodiment. One stationary mold of the two-cavity mold is illustrated, and for sake of simplification of the drawing, bolts and bolt holes for engaging molding parts and a thermocouple serving as a temperature measuring instrument for controlling the heater are not shown. A movable mold is not shown, but it is arranged on a lower side of FIG. 1 with respect to the stationary mold. The size of the mold is set to a size that can be mounted on a 50-ton molding machine, and a distance from an uppermost side of a stationary mounting plate 1, that is, upstream in a molten resin flow path, to a gate is set to L1=120 mm.

In FIG. 1, reference number 1 denotes a stationary mounting plate, 2 denotes a manifold storage plate, 3 denotes a stationary mold plate, 4 denotes a stationary cavity-forming plate, 5 denotes a stationary cavity, and 21 denotes a parting line. Further, 18 denotes a sprue, 24 denotes a manifold, and 39 denotes a hot runner nozzle body. Further, 20 denotes a sprue-heating heater, 10 denotes a manifold-heating heater, and 25 denotes a hot runner nozzle-heating heater, each member functioning as a heating unit for heating determined portions. Reference number 9 denotes a water pipe hole for controlling the mold temperature.

A cavity formed on an inner side of a cylindrical hot runner nozzle body 39 is a flow path for molten resin, and during injection molding, the temperature of the flow path is maintained to a melting temperature of resin or higher. The manifold 24 functions as a supply portion through which molten resin is supplied to the hot runner nozzle body 39. The hot runner nozzle body 39, a nozzle support member 8, the manifold 24, a manifold-center support member 19, a sleeve 13 and a manifold support member 14 are nipped and fixed by mounting plates 1, 2, 3 and 4. The manifold 24 is joined to the hot runner nozzle body 39 tightly enough so as not to cause leakage of molten resin by engaging the respective mold plates by bolts not shown while taking the amount of heat expansion into consideration.

Reference number 7 denotes a gate valve pin for opening and closing an injection gate of molten resin, and the gate valve pin 7 is capable of advancing and retreating within the hot runner nozzle body 39 by the operation of an air cylinder 38. The air cylinder 38 includes a component 17 that defines a retreat limit of the gate valve pin 7, components 15, 22 and 23 that support a rear end of the gate valve pin, and O ring 16. The air cylinder operates at a matched timing with injection and stopping of injection of resin during a molding step to retreat or advance the gate valve pin 7 by supplying differential pressure at an arbitrary timing through air inlet/exhaust holes 11 and 12.

Figure 2:
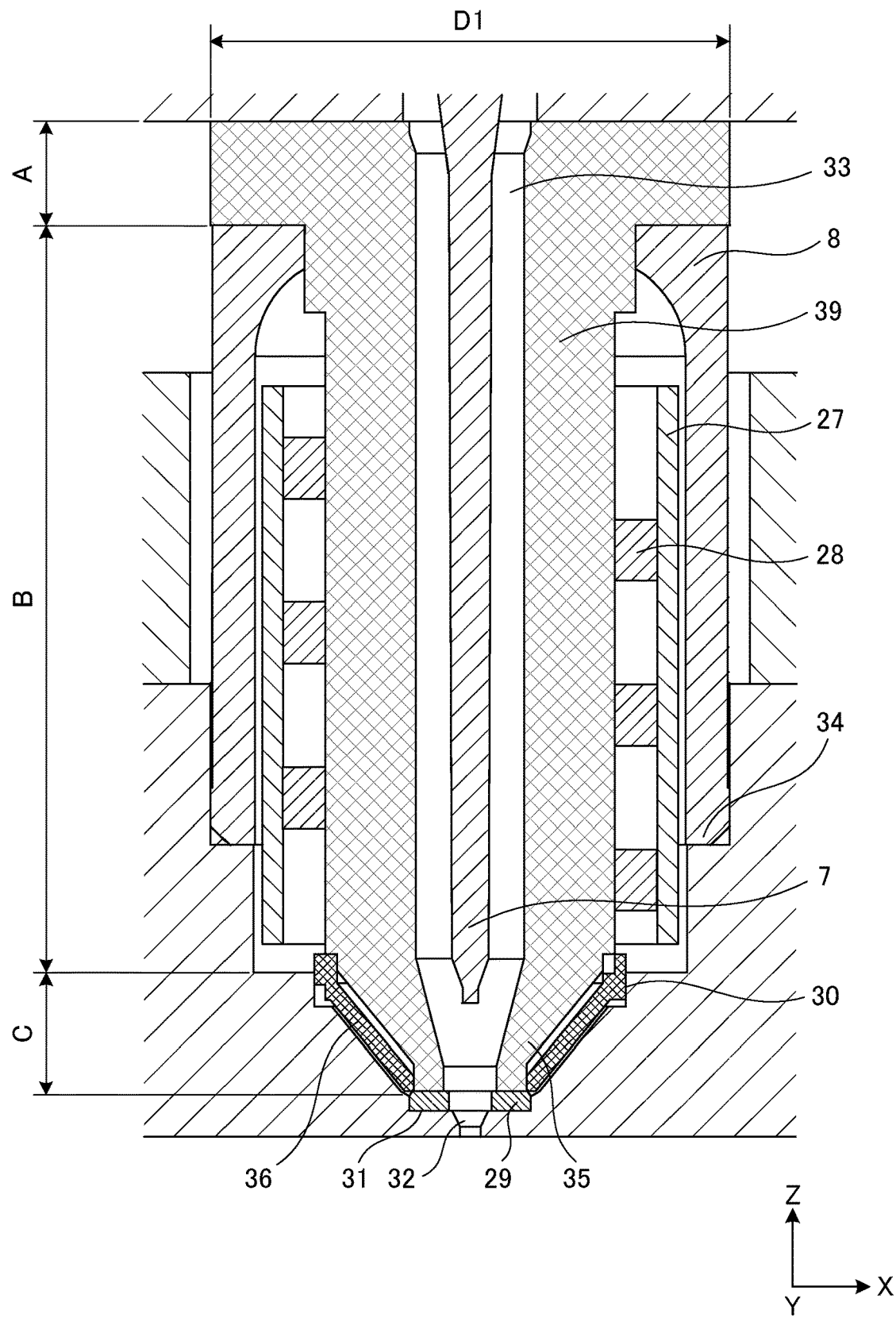
FIG. 2 is an enlarged cross-sectional view illustrating in enlarged view a cross section of a hot runner nozzle according to the first embodiment.

The hot runner nozzle according to the present embodiment will be described in further detail with reference to FIG. 2. FIG. 2 is an enlarge cross-sectional view of the hot runner nozzle. The hot runner nozzle includes, from an upstream side toward a downstream side of a flow path 33 of molten resin in the named order, a base portion denoted by reference A that receives clamping force in an axial direction, a nozzle center portion denoted by reference B that has an approximately cylindrical outer diameter, and a nozzle tip portion denoted by reference C having an outer shape of a truncated cone. A total length of the nozzle, that is, lengths of A+B+C, is set to 47 mm, and a maximum diameter of the nozzle is set to D1=25.0 mm. The material of the hot runner nozzle body 39 is a stainless steel-based material having a heat conductivity of approximately 20 to 30 W/m·K, and a sufficient mechanical strength is ensured.

Reference number 28 denotes a coil heater and 27 denotes a heater cover, wherein the heater cover 27 is designed to press the coil heater 28 from the outer side toward the inner side. The nozzle support member 8 does not contact the heater cover 27, but the nozzle support member 8 contacts the hot runner nozzle body 39 at a leading edge, that is, lower end, of base portion A and contacts the mold at a contact point 34. The nozzle support member 8 serves as a heat conduction path from the hot runner nozzle body 39 to the mold. That is, amount of heat transfer of the heat from the base portion A or the nozzle center portion B of the hot runner nozzle body 39 to the mold is suppressed by adopting a configuration where heat is transferred through a length of the nozzle support member 8 in the axial direction of the nozzle.

Reference number 32 denotes an injection gate of molten resin, and the injection gate 32 is opened and closed by the gate valve pin 7.

A tip portion 35 of the hot runner nozzle body 39 is arranged in contact with a mold-side contact point 31 with a ring member 29 formed of super engineering plastic resin having high heat resistance interposed therebetween, so that heat transfer from the tip portion 35 to the mold through direct contact is suppressed. However, since the ring member 29 can be damaged by resin pressure and clamping force applied to the nozzle in the axial direction, the ring member 29 alone cannot ensure complete prevention of resin leakage.

Therefore, the present embodiment provides a cover member 36 to ensure prevention of resin leakage while reducing the contact area between the cover member 36 and the mold to thereby suppress heat transfer from the tip portion 35 of the nozzle to the mold. The cover member 36 is arranged at an outer periphery of the tip portion 35 of the hot runner nozzle body 39, and a part of the cover member 36 is in close contact with the mold to thereby prevent leakage of resin.

Figure 3A:
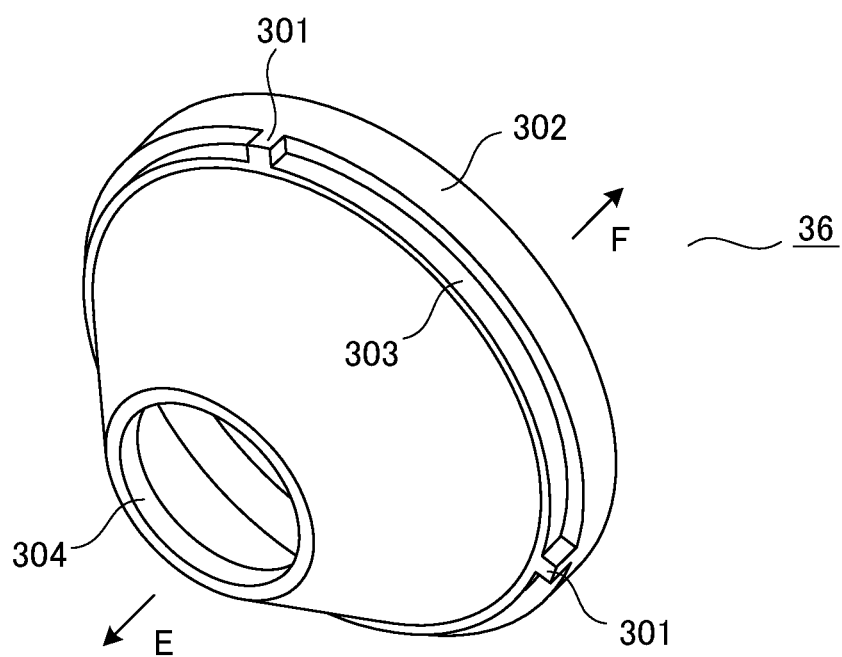
FIG. 3A is a schematic view of a cover member according to the first embodiment.
Figure 3B:
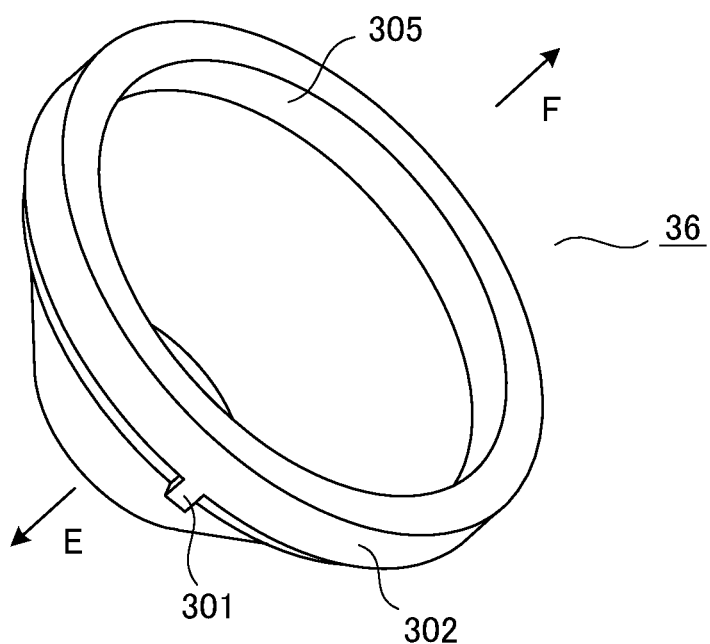
FIG. 3B is a schematic view illustrating the cover member according to the first embodiment from another direction.
Figure 4A:
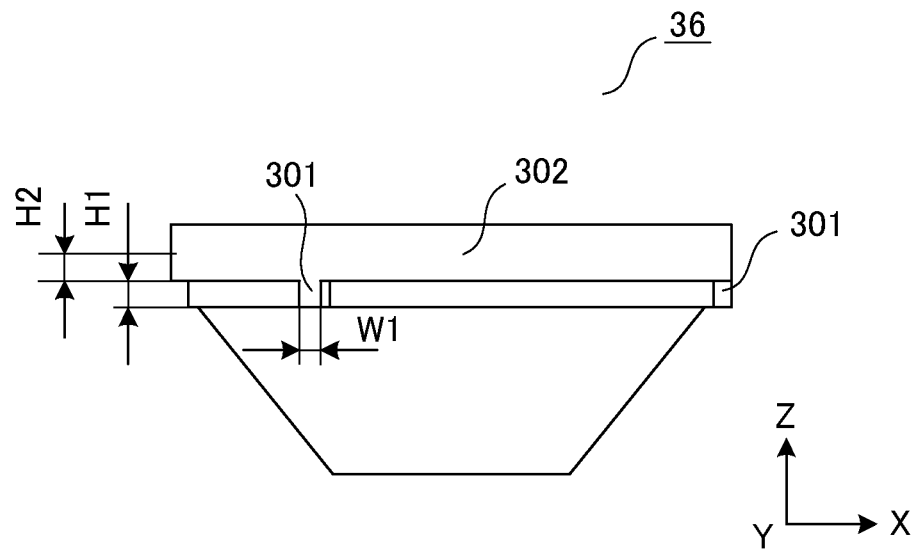
FIG. 4A is a side view of the cover member according to the first embodiment.
Figure 4B:
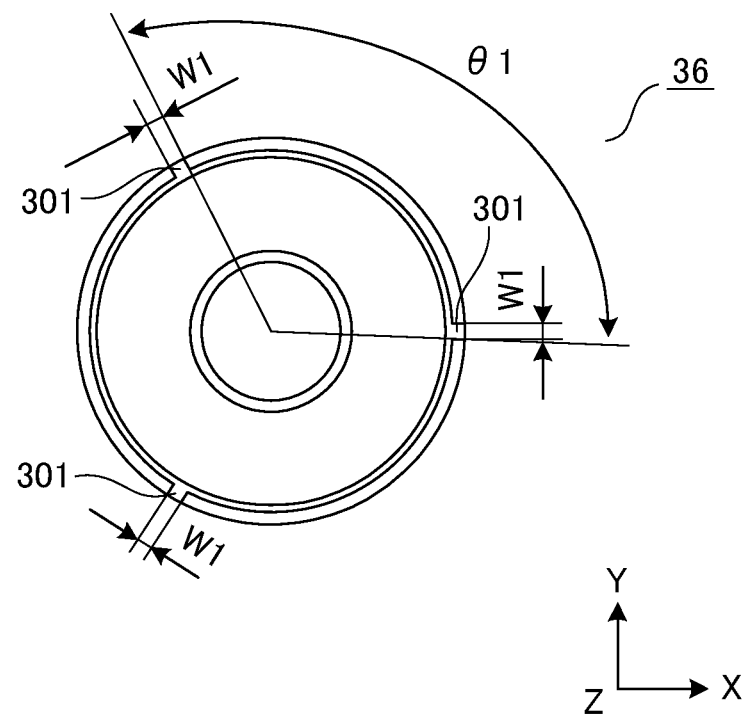
FIG. 4B is a plan view of the cover member according to the first embodiment.

FIGS. 3A and 3B are schematic views illustrating the exterior of the cover member 36 from different directions. FIG. 4A is a side view of the cover member 36, and FIG. 4B is a plan view of the cover member 36. In FIGS. 3A and 3B, arrow F indicates a manifold side, and arrow E indicates a gate side. In other words, arrow F indicates direction Z in an X-Y-Z coordinate system.

The cover member 36 includes a partial engagement portion 301 and an annular engagement portion 302, wherein these portions come in direct contact with the mold. Meanwhile, a dented portion 303 has a smaller outer diameter than the partial engagement portion 301 and the annular engagement portion 302, and a structure is adopted where the dented portion 303 and an inclined surface portion of the cone are not in direct contact with the mold, so that a contact area between the cover member 36 and mold is reduced.

The partial engagement portion 301 serving as a first engagement portion is a protruded portion that protrudes toward the mold, that engages with the recessed portion provided on the mold and positions the cover member 36 with respect to the mold. A number, a width W1, an axial length H1 and a phase θ1 of the partial engagement portion 301 are set arbitrarily to ensure positioning accuracy and mechanical strength, and in the present embodiment, the number of the partial engagement portion 301 is set to 3 as illustrated in FIG. 4B. Further, W1 is set to 0.6 mm, H1 is set to 0.5 mm and θ1 is set to 120 degrees, but these values are mere examples, and the values are not limited thereto.

The shape of a portion of the annular engagement portion 302 in close contact with the mold is determined arbitrarily to suppress leakage of molten resin. In the present embodiment, an engagement length of the annular engagement portion 302 with the mold at room temperature is set to H2=0.2 mm, but the engagement length is not limited thereto, and it can be adjusted arbitrarily while considering dispersion of tolerance of the hot runner and the mold.

The cover member 36 further includes a gate-side engagement portion 304 that is arranged on the gate side, as illustrated in FIG. 3A, wherein an inner peripheral surface of the gate-side engagement portion 304 is in contact with an outer peripheral surface of the tip portion 35 of the hot runner nozzle body 39. Further, the cover member 36 includes a whole-circumference engagement portion 305 that is arranged on the manifold side, as illustrated in FIG. 3B, and an inner peripheral surface of the whole-circumference engagement portion 305 is in contact with an outer peripheral surface of the hot runner nozzle body 39. The cover member 36 is positioned against and fixed to the hot runner nozzle body 39 by the gate-side engagement portion 304 and the whole-circumference engagement portion 305.

As described, according to the present embodiment, the cover member 36 is arranged at the circumference of the tip portion 35 of the hot runner nozzle body 39, and the partial engagement portion 301, the annular engagement portion 302, the dented portion 303, the gate-side engagement portion 304 and the whole-circumference engagement portion 305 are provided on the cover member 36. The partial engagement portion 301 and the annular engagement portion 302 of the cover member 36 are engaged with the mold, and the gate-side engagement portion 304 and the whole-circumference engagement portion 305 of the cover member 36 are engaged with the hot runner nozzle body 39. Thereby, the hot runner nozzle body 39 is positioned highly accurately and fixed to the mold via the cover member 36.

In a state where the annular engagement portion 302 is in close contact with the mold and the whole-circumference engagement portion 305 is in close contact with the outer periphery of the hot runner nozzle without any gap, the cover member 36 functions as a packing, i.e., sealing member. Thus, leakage of molten resin can be prevented reliably even if the durability of the ring member 29 formed of a low heat conduction material is low. That is, the annular portion arranged on the manifold side of the cover member suppresses leakage through the gap formed between the hot runner nozzle body and the mold of molten resin that has been injected from the hot runner nozzle body but not injected into the cavity formed by the mold serving as space for molding the resin molded product.

A structure is adopted where the dented portion 303 and the inclined surface portion of the cone do not contact the mold directly by providing the dented portion 303 having a smaller outer diameter than both the annular engagement portion 302 and the partial engagement portion 301 on the cover member 36, according to which the contact area between the cover member 36 and the mold can be reduced. Thereby, the amount of heat conducted from the hot runner nozzle body 39 via the cover member 36 to the mold can be suppressed, and therefore, temperature drop at the tip portion of the hot runner nozzle can be suppressed effectively.

Second Embodiment

An injection molding apparatus according to a second embodiment includes a cover member that is arranged at a circumference of a tip portion of a hot runner nozzle body. A shape of the cover member is different from that of the first embodiment. Descriptions of portions that are common to the first embodiment are omitted.

Figure 5A:
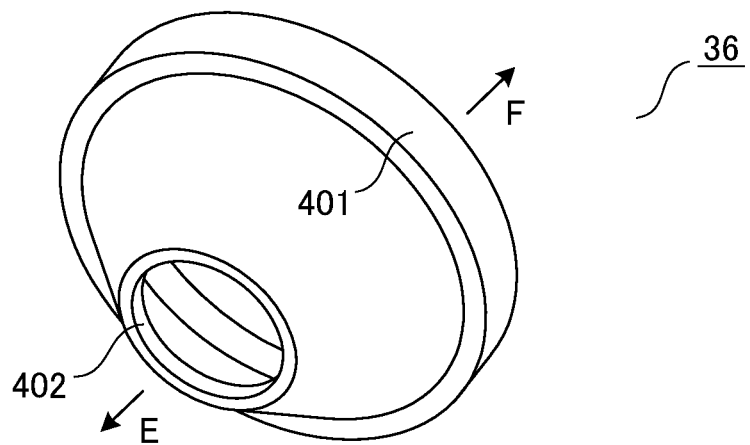
FIG. 5A is a schematic view of a cover member according to a second embodiment.
Figure 5B:
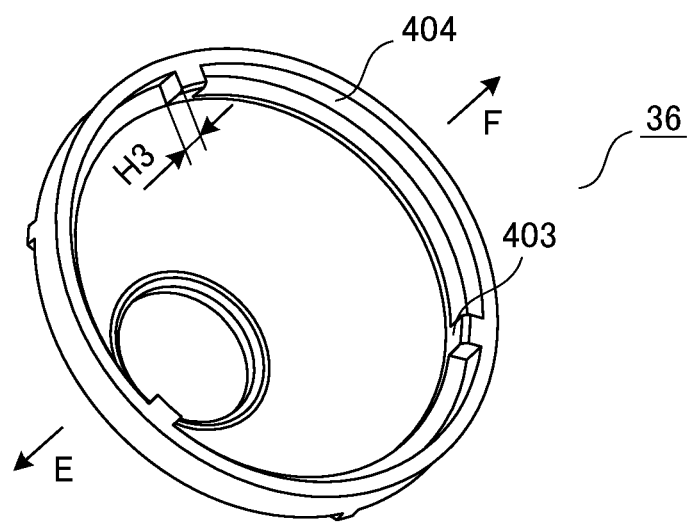
FIG. 5B is a schematic view illustrating the cover member according to the second embodiment from another direction.
Figure 5C:
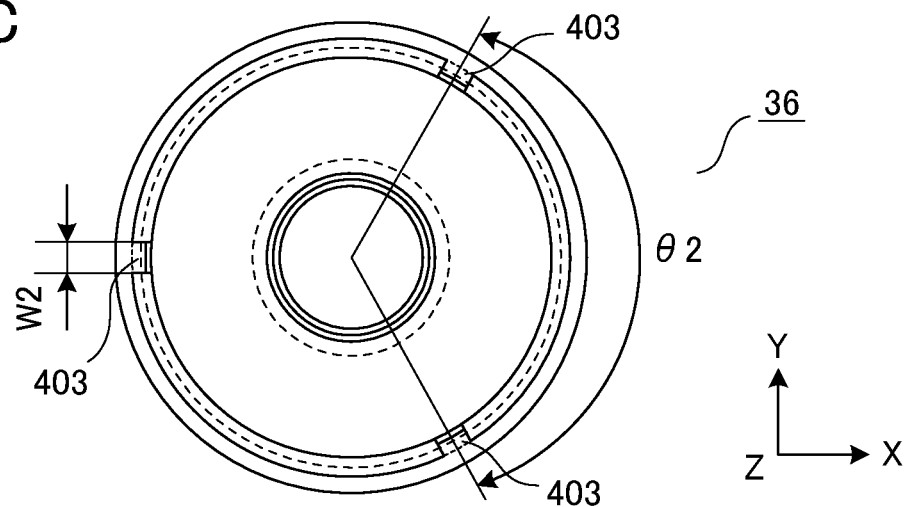
FIG. 5C is a plan view of the cover member according to the second embodiment.

FIGS. 5A and 5B are schematic views illustrating an exterior of a cover member 36 according to the second embodiment from different directions, and FIG. 5C is a bottom view of the cover member 36 according to the second embodiment.

A shape of an annular part positioned on a manifold side of the cover member 36 according to the present embodiment differs from the first embodiment in that a partial engagement portion 403 and a whole-circumference engagement portion 404 are provided on an inner peripheral side of the annular part 401.

The partial engagement portion 403 is a protruded portion that is protruded toward the hot runner nozzle body 39, that engages with a recessed portion provided on the hot runner nozzle body 39 and positions the cover member 36 with respect to the hot runner nozzle body 39. A number, a width W2, an axial length H3 and a phase θ2 of the partial engagement portion 403 are determined arbitrarily to ensure positioning accuracy and mechanical strength, and in the present embodiment, the number of the partial engagement portion 403 is set to 3 as illustrated in FIG. 5C. Further, W2 is set to 1 mm, H3 is set to 1.0 mm and θ2 is set to 120 degrees, but these values are mere examples, and the values are not limited thereto.

By providing the annular engagement portion 302 similar to the first embodiment, the cover member 36 according to the present embodiment can be engaged with the mold. Further, by providing a gate-side engagement portion 402 similar to the first embodiment, a whole-circumference engagement portion 404 that differs from the first embodiment, and a partial engagement portion 403 that serves as a second engagement portion, the cover member 36 according to the present embodiment can be engaged with the hot runner nozzle body 39. Thereby, the hot runner nozzle body 39 is positioned highly accurately and fixed to the mold via the cover member 36.

In a state where the annular engagement portion 302 is in close contact with the mold and the whole-circumference engagement portion 404 is in close contact with the outer periphery of the hot runner nozzle without any gap, the cover member 36 functions as a packing, i.e., sealing member. Thus, leakage of molten resin can be prevented reliably even if the durability of the ring member 29 formed of a low heat conduction material is low. That is, the annular portion arranged on the manifold side of the cover member suppresses leakage through the gap formed between the hot runner nozzle body and the mold of molten resin that has been injected from the hot runner nozzle body but not injected into the cavity of the mold.

A structure is adopted where the dented portion and the inclined surface portion of the cone do not contact the hot runner nozzle body 39 directly by providing the dented portion that has a greater inner diameter than the whole-circumference engagement portion 404 on the cover member 36, according to which the contact area between the cover member 36 and the hot runner nozzle body 39 can be reduced. Thereby, the amount of heat conducted from the hot runner nozzle body 39 via the cover member 36 to the mold can be suppressed, and therefore, temperature drop at the tip portion of the hot runner nozzle can be suppressed effectively.

Third Embodiment

According to the cover member of the first embodiment, the partial engagement portion 301 and the annular engagement portion 302 were engaged with the mold for positioning, and a dented portion 303 having a smaller outer diameter than the partial engagement portion 301 or the annular engagement portion 302 was provided to reduce the contact area between the cover member and the mold.

Further, according to the cover member of the second embodiment, the gate-side engagement portion 304 similar to the first embodiment and the whole-circumference engagement portion 404 and the partial engagement portion 403 which were not included in the first embodiment were provided, which were engaged with the hot runner nozzle body 39 for positioning. A dented portion having a greater inner diameter than the whole-circumference engagement portion 404 was provided to realize a structure where the dented portion and the inclined surface portion of the cone are not in direct contact with the hot runner nozzle body 39, by which the contact area between the cover member 36 and the hot runner nozzle body 39 was reduced.

In contrast, the cover member according to the third embodiment includes both the partial engagement portion 301 and the dented portion 303 according to the first embodiment and the partial engagement portion 403 and the dented portion according to the second embodiment. This configuration allows to further suppress the amount of heat conducted from the hot runner nozzle body 39 via the cover member 36 to the mold.

Figure 9A:
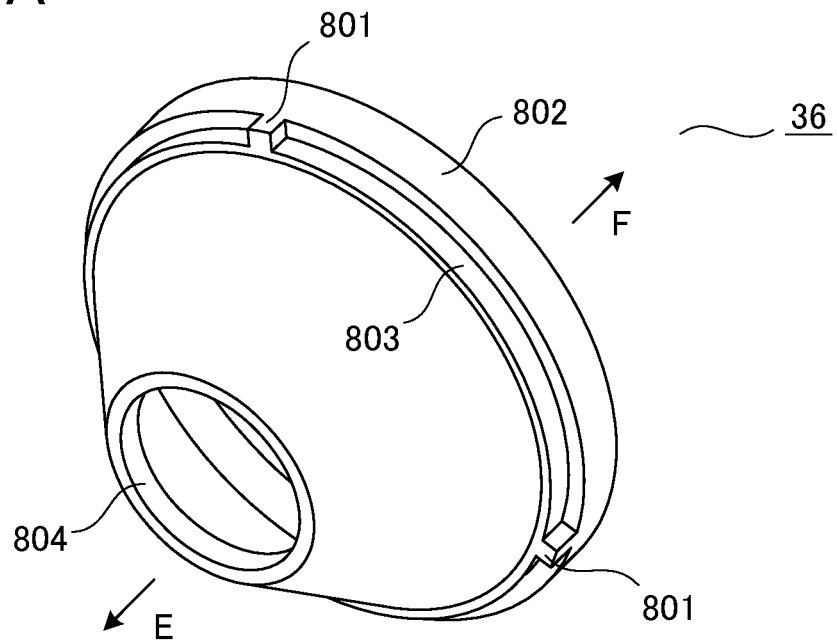
FIG. 9A is a schematic view of a cover member according to a third embodiment.
Figure 9B:
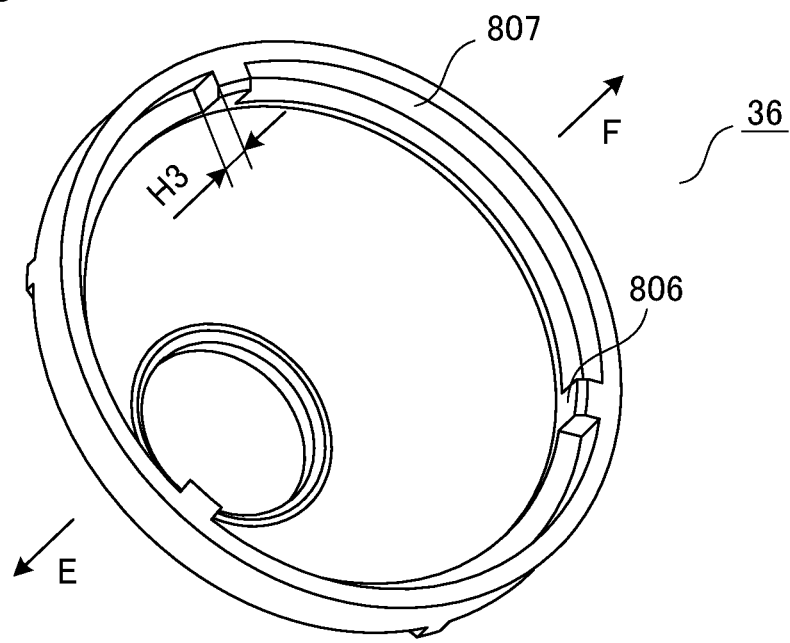
FIG. 9B is a schematic view illustrating the cover member according to the third embodiment from another direction.
Figure 10A:
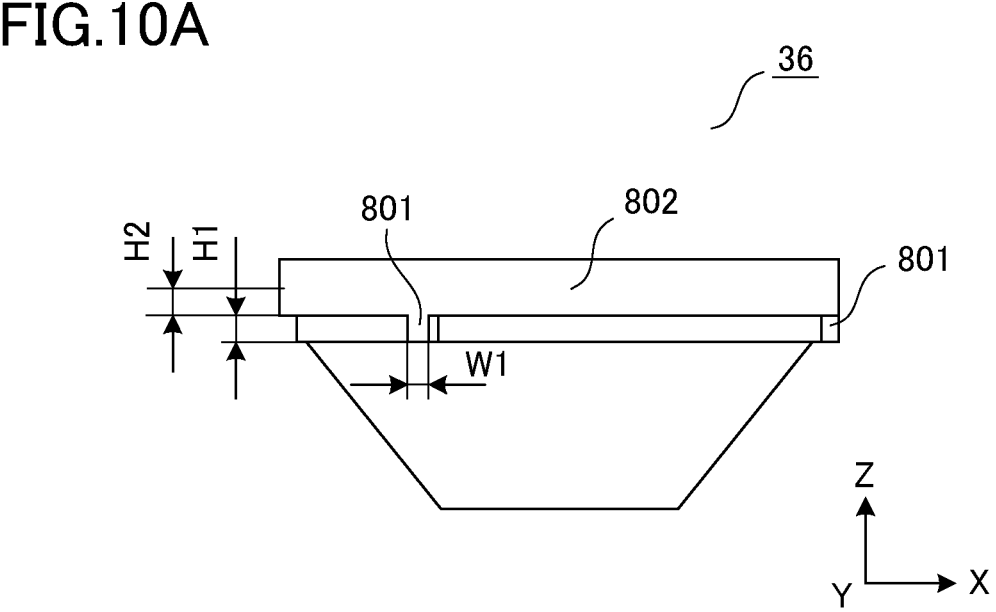
FIG. 10A is a side view of the cover member according to the third embodiment.
Figure 10B:
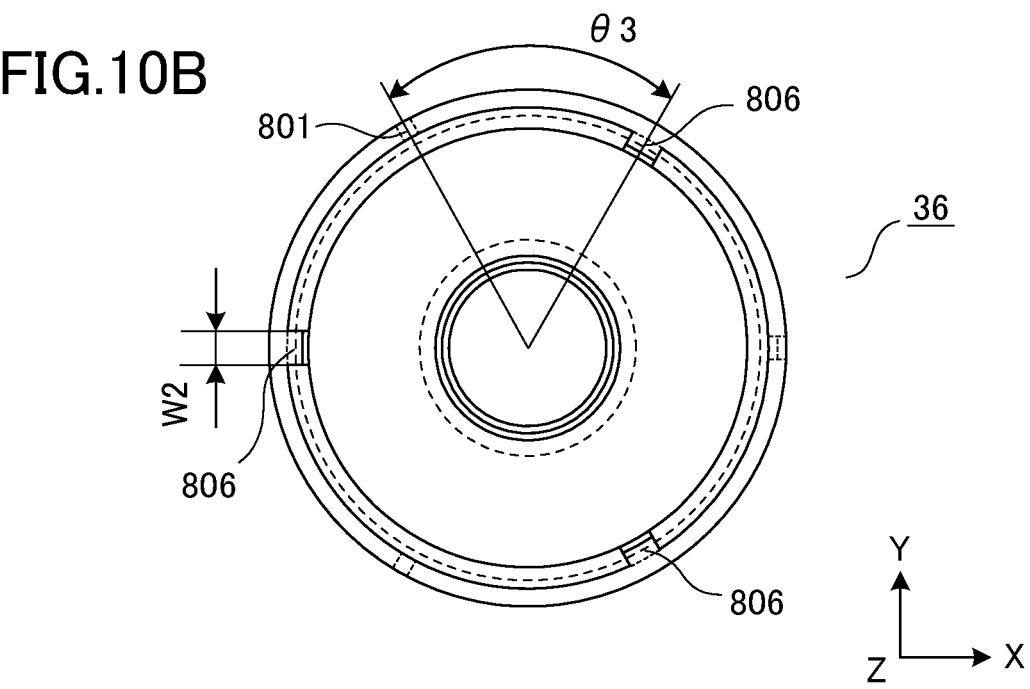
FIG. 10B is a plan view of the cover member according to the third embodiment.

FIGS. 9A and 9B are schematic views illustrating an exterior of a cover member 36 according to the third embodiment from different directions. FIG. 10A is a side view of the cover member 36, and FIG. 10B is a plan view of the cover member 36.

As illustrated, a partial engagement portion 801, an annular engagement portion 802 and a dented portion are provided on an outer periphery portion of the annular part positioned on the manifold side, similar to the first embodiment. Further, a partial engagement portion 806 and a whole-circumference engagement portion 807 are provided on an inner periphery portion of the annular part positioned on the manifold side, similar to the second embodiment. Further, a gate-side engagement portion 804 is provided on an inner periphery portion positioned on the gate side, similar to the first embodiment or the second embodiment.

The partial engagement portion 806 is a protruded portion that is protruded toward the hot runner nozzle body 39, that engages with a recessed portion provided on the hot runner nozzle body 39 and positions the cover member 36 with respect to the hot runner nozzle body 39. A number, a width W2, an axial length H3 and a phase of the partial engagement portion 806 are determined arbitrarily to ensure positioning accuracy and mechanical strength, and in the present embodiment, the number of the partial engagement portion 806 is set to 3 as illustrated in FIGS. 9B and 10B. Further, W2 is set to 1 mm, H3 is set to 1.0 mm and the phase difference between respective partial engagement portions 806 is set to 120 degrees, but these values are mere examples, and the values are not limited thereto. Further, a phase θ3 (FIG. 10B) of the partial engagement portion 801 of the outer periphery portion and the partial engagement portion 806 of the inner periphery portion is determined arbitrarily based on mutual positioning accuracy or fixing strength of the mold, the cover member and the hot runner nozzle body or design of the heat flow path. However, the partial engagement portion 801 of the outer periphery portion and the partial engagement portion 806 of the inner periphery portion should preferably be arranged so that they are not mutually overlapped when viewed in the axial direction of the hot runner nozzle body, that is, so that the phase difference is not set to zero degrees. In the present embodiment, the phase is set to θ3=60 degrees.

By providing the partial engagement portion 801 and the annular engagement portion 802 similar to the first embodiment, the cover member 36 according to the present embodiment can be engaged with the mold. Further, by providing the gate-side engagement portion 804 and the partial engagement portion 806 similar to the second embodiment, the cover member 36 according to the present embodiment can be engaged with the hot runner nozzle body 39. Thereby, the hot runner nozzle body 39 is positioned and fixed highly accurately to the mold via the cover member 36.

In a state where the annular engagement portion 802 is in close contact with the mold and the whole-circumference engagement portion 807 is in close contact with the outer periphery of the hot runner nozzle without any gap, the cover member 36 functions as a packing, i.e., sealing member. Thus, leakage of molten resin can be prevented reliably even if the durability of the ring member 29 formed of a low heat conduction material is low. That is, the annular portion arranged on the manifold side of the cover member suppresses leakage through the gap formed between the hot runner nozzle body and the mold of molten resin that has been injected from the hot runner nozzle body but not injected into the cavity of the mold.

A structure is adopted where the dented portion and the inclined surface portion of the cone do not contact the hot runner nozzle body 39 directly by providing the dented portion that has a greater inner diameter than the whole-circumference engagement portion 807 on the cover member 36, according to which the contact area between the cover member 36 and the hot runner nozzle body 39 can be reduced. At the same time, since a dented portion 803 having a smaller outer diameter than the partial engagement portion 801 and the annular engagement portion 802 is provided on the cover member 36, the dented portion 803 and the inclined surface portion of the cone are not in direct contact with the mold, so that the contact area between the cover member 36 and the mold is reduced. Thereby, the amount of heat conducted from the hot runner nozzle body 39 via the cover member 36 to the mold can be suppressed further than the first and second embodiments, and temperature drop at the tip portion of the hot runner nozzle can be suppressed effectively.

Fourth Embodiment

An injection molding apparatus according to a fourth embodiment is equipped with a hot runner nozzle having a different shape as the hot runner nozzle according to the first embodiment. Parts that are common to the first embodiment are not described in the present embodiment. The hot runner nozzle according to the fourth embodiment is also applicable to an injection molding apparatus equipped with not only the cover member according to the first embodiment but also the cover member according to the second and third embodiments.

In the hot runner nozzle according to the first embodiment, as have been described with reference to FIG. 2, the hot runner nozzle body 39 has been formed of a single material from the base portion A to the nozzle tip portion C. That is, for example, the hot runner nozzle according to the first embodiment was formed of a stainless steel-based material having a thick wall and a heat conductivity of approximately 20 to 30 W/m·K. In contrast, according to the hot runner nozzle of the present embodiment, a circumference of a hot runner nozzle body having a thin thickness is designed to be surrounded by a material having higher heat conductivity.

Figure 6:
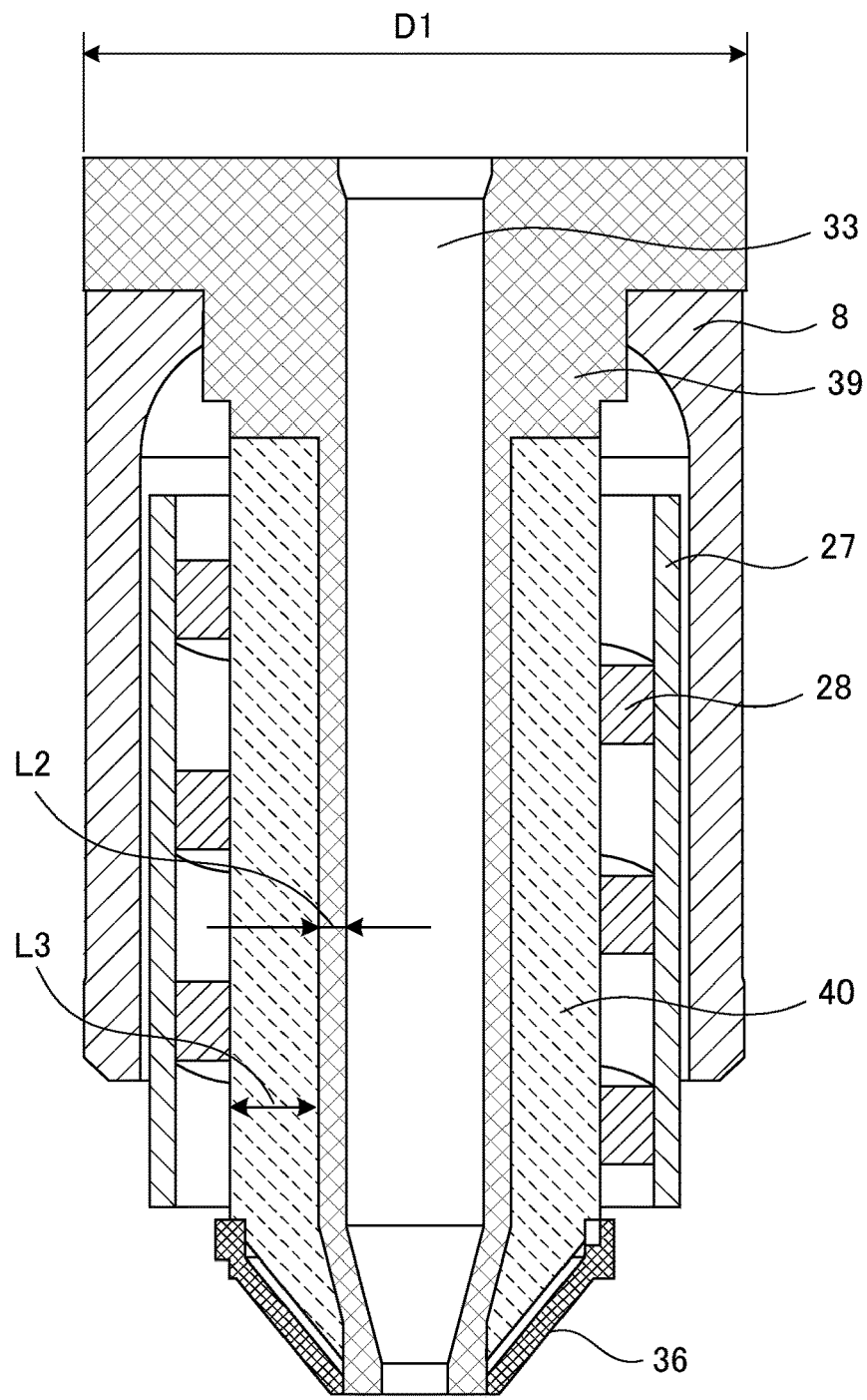
FIG. 6 is an enlarged cross-sectional view illustrating a hot runner nozzle according to a fourth embodiment in enlarged cross-section.
Figure 6:
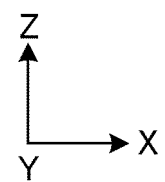
Figure 7A:
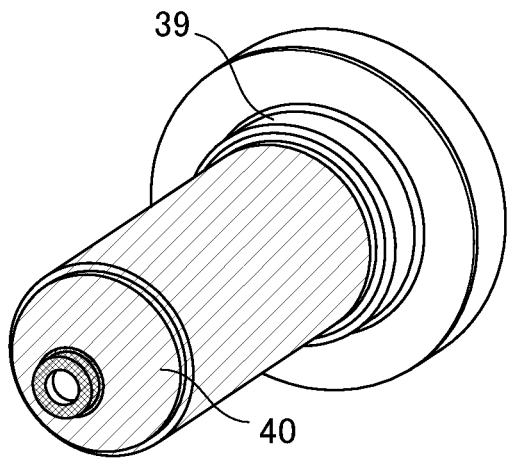
FIG. 7A is a schematic view illustrating an exterior of a hot runner nozzle according to the fourth embodiment.
Figure 7B:
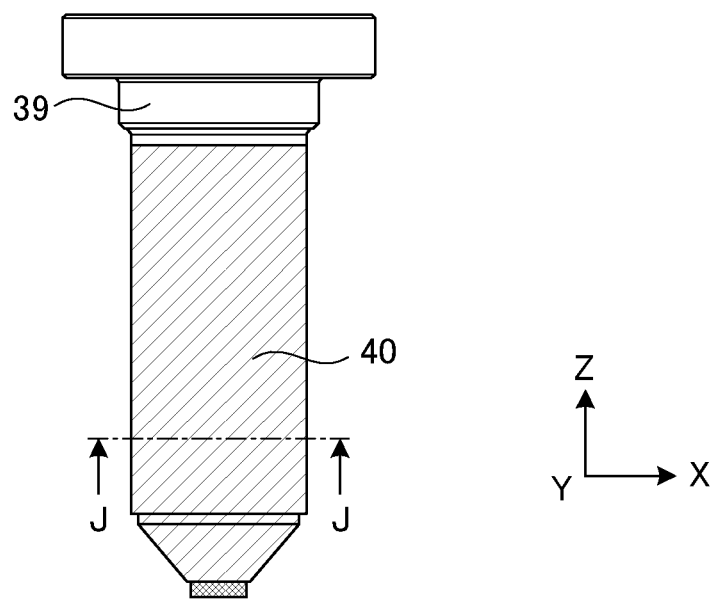
FIG. 7B is a front view illustrating an exterior of the hot runner nozzle according to the fourth embodiment.
Figure 7C:
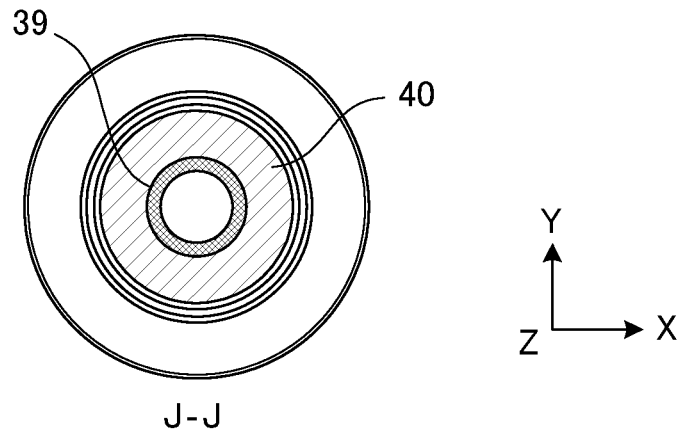
FIG. 7C is a cross-sectional view of the hot runner nozzle according to the fourth embodiment.

FIG. 6 is an enlarged cross-sectional view illustrating a hot runner nozzle according to the fourth embodiment in enlarged cross-section. Further, FIGS. 7A, 7B and 7C are a schematic external view, a front view, and a cross-sectional view taken along line J-J of FIG. 7B of the hot runner nozzle according to the fourth embodiment. Similar to the first embodiment, a total length of the nozzle is set to 47 mm and a maximum diameter of the nozzle is set to D1=25.0 mm.

The hot runner nozzle body 39 receives direct injection pressure since a flow path of molten resin is formed on the inner side thereof, so that it is formed of a stainless-steel material having high rigidity, similar to the first embodiment. However, a wall thickness of the hot runner nozzle body 39 from the nozzle center portion having an approximately cylindrical outer diameter to the nozzle tip portion having a truncated cone shape on the outer side is made thinner than the first embodiment. Mechanical rigidity is reinforced by arranging a nickel material whose main component is nickel on a circumference of a part of the hot runner nozzle body 39 where the wall is thin, that is, from the nozzle center portion having the approximately cylindrical outer diameter to the nozzle tip portion having the truncated cone shape on the outer side.

In the present description, the part formed of the nickel material is referred to as a nozzle outer layer portion 40. The nozzle outer layer portion 40 according to the present embodiment surrounds an outer periphery of the hot runner nozzle body 39 annularly. In the present embodiment, a hot runner nozzle including a hot runner nozzle body 39 whose main component is stainless steel and a nozzle outer layer portion 40 whose main component is nickel are formed integrally using a laser cladding method. A thickness of stainless steel at the nozzle center portion is set to L2=0.5 to 1.0 mm and a thickness of nickel is set to L3=3.5 mm. A heat conductivity of the stainless-steel material constituting the hot runner nozzle body 39 is set to 20 to 30 W/m·K, and a heat conductivity of the nickel material constituting the nozzle outer layer portion 40 is set to 80 to 90 W/m·K.

The hot runner nozzle according to the present embodiment can conduct the heat of the coil heater 28 efficiently to an area near the flow path of molten resin by arranging the nozzle outer layer portion 40 having a high heat conductivity as a rigidity reinforcement portion around the hot runner nozzle body 39 having a thin wall. Thereby, responsiveness, or controllability, of temperature control is enhanced, and the temperature drop at the nozzle tip portion can be suppressed.

The hot runner nozzle is not necessarily formed integrally using a laser cladding method, and for example, the hot runner nozzle body 39 and the nozzle outer layer portion 40 can be formed as separate members in advance, and they can be integrated by press fitting or welding. Further, the thicknesses and shapes of the hot runner nozzle body 39 and the nozzle outer layer portion 40 can be changed arbitrarily from the above-mentioned example as long as necessary mechanical rigidity is ensured. The material of the nozzle outer layer portion 40 is not limited to nickel, and other materials such as copper alloy or copper can be used as the main component, since any material having higher heat conductivity than the hot runner nozzle body 39 and a certain level of rigidity can be used.

Fifth Embodiment

An injection molding apparatus according to a fifth embodiment is equipped with a hot runner nozzle having a different shape as the hot runner nozzle according to the first embodiment or the fourth embodiment. Parts that are common to the first embodiment or the fourth embodiment are not described in the present embodiment. The hot runner nozzle according to the fifth embodiment can also be applied to an injection molding apparatus equipped with not only the cover member according to the first embodiment but also the cover member according to the second and third embodiments.

In the hot runner nozzle according to the first embodiment, as have been described with reference to FIG. 2, the hot runner nozzle body 39 has been formed of a single material from the base portion A to the nozzle tip portion C. That is, for example, the hot runner nozzle according to the first embodiment was formed of a stainless steel-based material having a thick wall and a heat conductivity of approximately 20 to 30 W/m·K. In contrast, the hot runner nozzle of the present embodiment can be considered similar to the fourth embodiment in that a material having a higher heat conductivity is arranged on the circumference of a hot runner nozzle body having a thin wall thickness but differs from the fourth embodiment in that the shapes of the hot runner nozzle body and the high heat conduction material differ from those of the fourth embodiment.

Figure 8A:
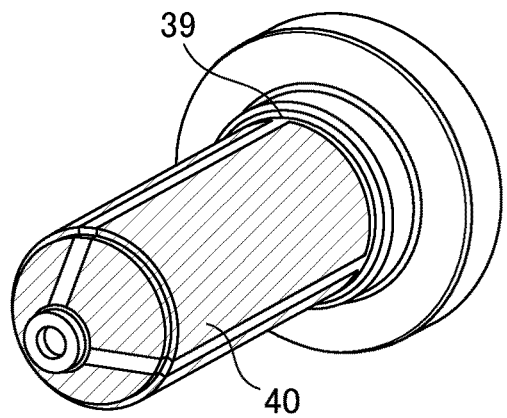
FIG. 8A is a schematic view illustrating an exterior of a hot runner nozzle according to a fifth embodiment.
Figure 8B:
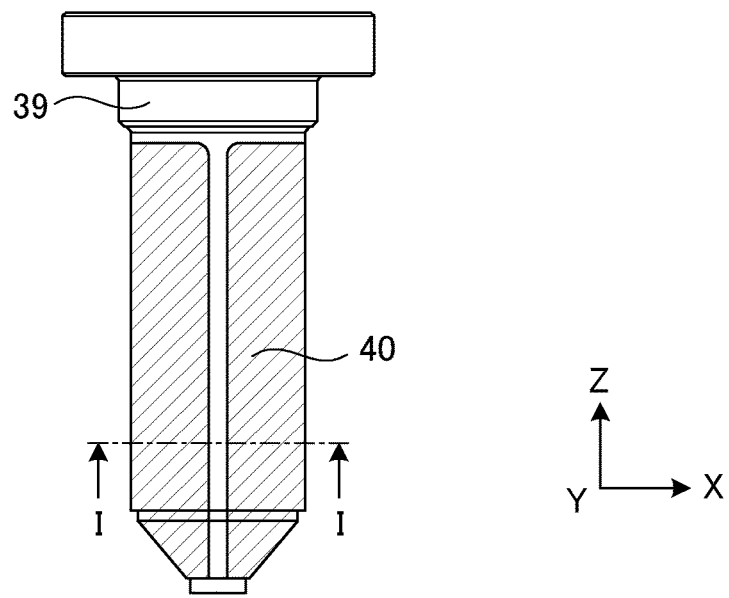
FIG. 8B is a front view illustrating the exterior of the hot runner nozzle according to the fifth embodiment.
Figure 8C:
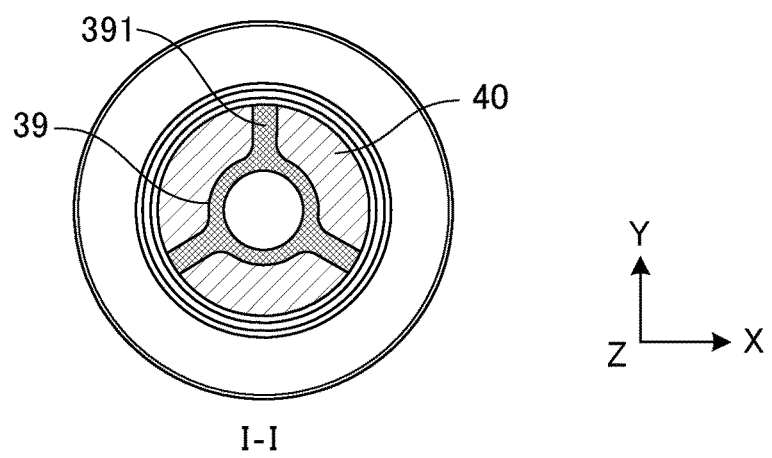
FIG. 8C is a cross-sectional view of the hot runner nozzle according to the fifth embodiment.

FIGS. 8A, 8B and 8C illustrate a schematic view, a front view, and a cross-sectional view taken along line I-I of FIG. 8B illustrating the hot runner nozzle according to the fifth embodiment. Similar to the first embodiment, the total length of the nozzle is set to 47 mm, and a maximum diameter of the nozzle is set to 25.0 mm.

A hot runner nozzle according to the present embodiment includes a hot runner nozzle body 39 having high rigidity and low heat conductivity whose shape differs from the fourth embodiment in that the hot runner nozzle body 39 includes three ribs 391 that extend radially outward from a cylindrical portion having a thin wall thickness. Then, a nozzle outer layer portion 40 having a relatively low rigidity but high heat conductivity is arranged between the three ribs 391. Therefore, as illustrated in FIG. 8A, the hot runner nozzle has an exterior where the rib 391 and the nozzle outer layer portion 40 are alternately arranged along the circumferential direction from the nozzle center portion having an approximately cylindrical outer diameter to the nozzle tip portion having an outer shape of a truncated cone. In the present embodiment, the number of ribs 391 is set to three and the ribs are arranged at 120-degree intervals along the circumferential direction, but the number and arrangement of the ribs is not limited to this example.

According to the present embodiment, the hot runner nozzle body 39 having the ribs 391 is formed of a material whose main component is stainless steel and the nozzle outer layer portion 40 is formed of a material whose main component is nickel using a laser cladding method.

The hot runner nozzle according to the present embodiment can conduct the heat of the coil heater 28 efficiently to an area near the flow path of molten resin by arranging the nozzle outer layer portion 40 having a high heat conductivity as a rigidity reinforcement portion around the hot runner nozzle body 39 having a thin wall. Thereby, responsiveness, or controllability, of temperature control is enhanced, and the temperature drop at the nozzle tip portion can be suppressed.

The hot runner nozzle is not necessarily formed integrally using a laser cladding method, and for example, the hot runner nozzle body 39 and the nozzle outer layer portion 40 can be formed as separate members in advance, and they can be integrated by press fitting or welding. Further, the thicknesses and shapes of the hot runner nozzle body 39 and the nozzle outer layer portion 40 can be changed arbitrarily from the above-mentioned example as long as the necessary mechanical rigidity is ensured. The material of the nozzle outer layer portion 40 is not limited to nickel, and other materials such as copper alloy or pure copper can be used as the main component, since any material having higher heat conductivity than the hot runner nozzle body 39 and a certain level of rigidity can be used.

In a case where the hot runner nozzle according to the present embodiment and the cover member described in the third embodiment are used in combination, it is preferable that the ribs 391 of the hot runner nozzle body 39 engage with the partial engagement portion 806 of the cover member 36. By having the ribs 391 formed of a low heat conduction material abut against the partial engagement portion 806, heat transfer from the hot runner nozzle body 39 to the cover member 36 can be suppressed.

EXAMPLES

Figure 12:
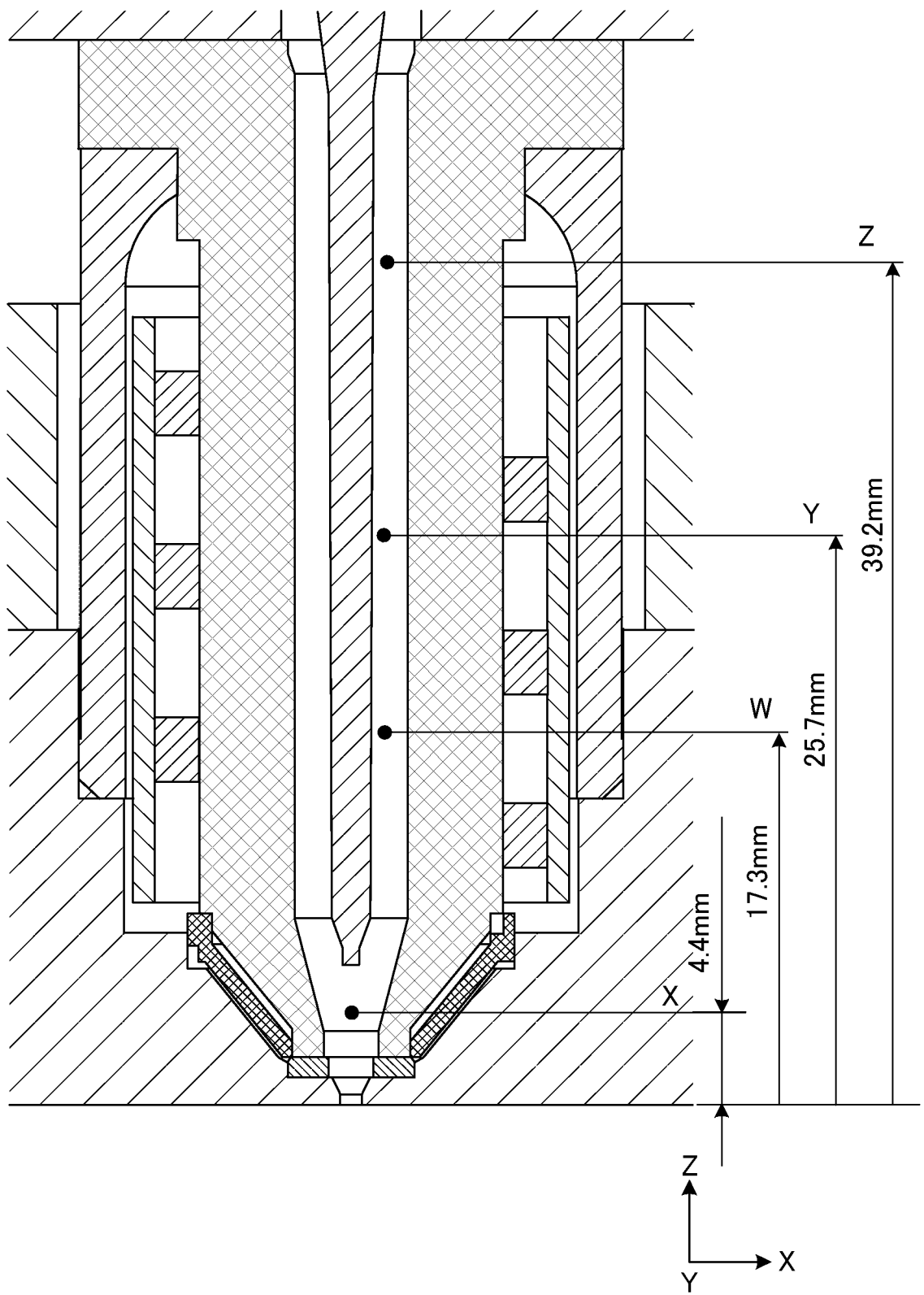
FIG. 12 is a view illustrating temperature measurement points according to the present embodiment.

Examples of the present invention and a comparative example will now be described. Temperature measurement of the hot runner nozzle was performed at temperature measurement points (point X, point Y, and point Z) illustrated in FIG. 12 according to the examples and the comparative example.

Three temperature measurement points were set, at 4.4 mm (point X), at 25.7 mm (point Y) and at 39.2 mm (point Z) from the gate toward the manifold.

Figure 13A:
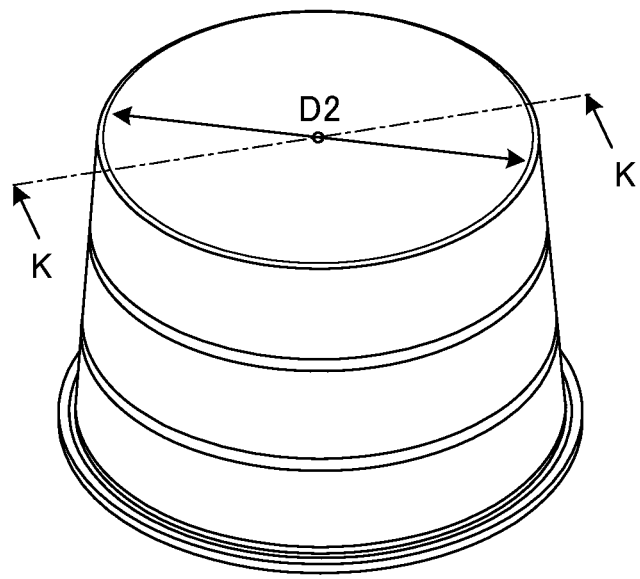
FIG. 13A is a schematic view illustrating an exterior of an injection-molded product manufactured according to an example.
Figure 13B:
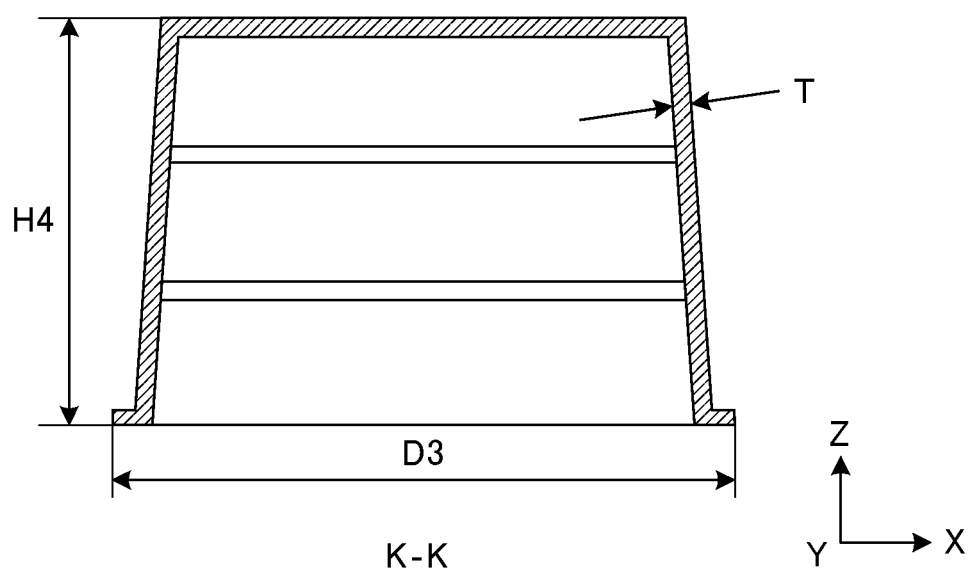
FIG. 13B is a cross-sectional view of the injection-molded product manufactured according to the example.

Further, a resin molded product whose exterior shape is illustrated in FIG. 13A and whose cross-sectional shape along line K-K is illustrated in FIG. 13B was created using an injection molding machine equipped with a hot runner nozzle according to the present example and the comparative example, and weight dispersion of the products were compared. The resin molded product having a cup shape has a gate-side diameter of D2=56 mm, a diameter on an opposite side of the gate of D3=68 mm, a wall thickness of T=2 mm, and a molded product height of H4=45 mm.

Weight dispersion is relieved if resin is filled up to a final filling portion while applying pressure, so evaluation was performed by short molding where approximately 10% of cavity weight is filled.

In the examples and the comparative example, temperature was measured and all resin molded products 50 were created under molding conditions shown in Table 1.

TABLE 1

| | |
|---|---|
| RESIN TEMPERATURE | 260° C. |
| MOLD TEMPERATURE | 60° C. |
| TEMPERATURE CONTROL FLOW | 6 L/min |
| HOT RUNNER TEMPERATURE | 260° C. |
| INJECTION SPEED | 50 mm/s |
| CYCLE | 30 s |

In the following description, for convenience of illustration, the hot runner nozzle body described in the first embodiment with reference to FIG. 2 is referred to as a nozzle N1, and the hot runner nozzle body described in the fourth embodiment with reference to FIGS. 6, 7A, 7B and 7C is referred to as a nozzle N2. Further, the hot runner nozzle body described in the fifth embodiment with reference to FIGS. 8A, 8B and 8C is referred to as a nozzle N3.

Further, the cover member described in the first embodiment with reference to FIGS. 3A, 3B, 4A and 4B is referred to as a cover member C1, and the cover member described in the second embodiment with reference to FIGS. 5A, 5B and 5C is referred to as a cover member C2. Further, the cover member described in the third embodiment with reference to FIGS. 9A, 9B, 10A and 10B is referred to as a cover member C3.

Example 1

In example 1, injection molding was performed using a hot runner nozzle including the nozzle N1 and the cover member C1, and temperatures of respective portions were measured. A thermocouple for heater control was inserted at a position of 17.3 mm from the gate toward the manifold, and the heater was controlled so that the temperature at control point W (FIG. 12) becomes 260° C.

As a result of the temperature measurement, the temperature was 260° C. at point W, 229° C. at point X, 265° C. at point Y, and 242° C. at point Z. The temperature difference within the hot runner nozzle was 46° C.

Further, the weight dispersion of the resin molded product 50 created by the molding conditions illustrated in Table 1 was evaluated using a coefficient of variation. Polybutylene terephthalate was used as the resin. The coefficient of variation was calculated by σ/AVE (%) using a standard deviation σ and an average value AVE. As a result of 20 shots, a was 0.15 g and AVE was 3.53 g, so that the coefficient of variation was 4.3%.

Example 2

In example 2, injection molding was performed using a hot runner nozzle including the nozzle N1 and the cover member C2, and temperature control was performed in a manner similar to example 1 to perform temperature measurement of respective portions.

As a result of the temperature measurement, the temperature was 260° C. at point W, 224° C. at point X, 264° C. at point Y, and 240° C. at point Z. The temperature difference within the hot runner nozzle was 40° C.

Further, the weight dispersion of the resin molded product 50 created by the molding conditions illustrated in Table 1 was evaluated using a coefficient of variation. Polybutylene terephthalate was used as the resin. The coefficient of variation was calculated by 3 σ/AVE (%) using the standard deviation σ and the average value AVE. As a result of 20 shots, a was 0.13 g and AVE was 3.45 g, so that the coefficient of variation was 3.7%.

Example 3

In example 3, injection molding was performed using a hot runner nozzle including the nozzle N1 and the cover member C3, and temperature control was performed in a manner similar to example 1 to perform temperature measurement of respective portions.

As a result of the temperature measurement, the temperature was 260° C. at point W, 225° C. at point X, 261° C. at point Y, and 233° C. at point Z. The temperature difference within the hot runner nozzle was 36° C.

Further, the weight dispersion of the resin molded product 50 created by the molding conditions illustrated in Table 1 was evaluated using a coefficient of variation. Polybutylene terephthalate was used as the resin. The coefficient of variation was calculated by 3 σ/AVE (%) using the standard deviation σ and the average value AVE. As a result of 20 shots, σ was 0.11 g and AVE was 3.22 g, so that the coefficient of variation was 3.4%.

Example 4

In example 4, injection molding was performed using a hot runner nozzle including the nozzle N2 and the cover member C1, and temperature control was performed in a manner similar to example 1 to perform temperature measurement of respective portions.

As a result of the temperature measurement, the temperature was 260° C. at point W, 231° C. at point X, 261° C. at point Y, and 233° C. at point Z. The temperature difference within the hot runner nozzle was 30° C.

Further, the weight dispersion of the resin molded product 50 created by the molding conditions illustrated in Table 1 was evaluated using a coefficient of variation. Polybutylene terephthalate was used as the resin. The coefficient of variation was calculated by 3 σ/AVE (%) using the standard deviation σ and the average value AVE. As a result of 20 shots, σ was 0.09 g and AVE was 3.31 g, so that the coefficient of variation was 2.7%.

Example 5

In example 5, injection molding was performed using a hot runner nozzle including the nozzle N2 and the cover member C2, and temperature control was performed in a manner similar to example 1 to perform temperature measurement of respective portions.

As a result of the temperature measurement, the temperature was 260° C. at point W, 230° C. at point X, 261° C. at point Y, and 232° C. at point Z. The temperature difference within the hot runner nozzle was 31° C.

Further, the weight dispersion of the resin molded product 50 created by the molding conditions illustrated in Table 1 was evaluated using a coefficient of variation. Polybutylene terephthalate was used as the resin. The coefficient of variation was calculated by 3 σ/AVE (%) using the standard deviation σ and the average value AVE. As a result of 20 shots, σ was 0.10 g and AVE was 3.40 g, so that the coefficient of variation was 2.9%.

Example 6

In example 6, injection molding was performed using a hot runner nozzle including the nozzle N3 and the cover member C2, and temperature control was performed in a manner similar to example 1 to perform temperature measurement of respective portions.

As a result of the temperature measurement, the temperature was 260° C. at point W, 231° C. at point X, 261° C. at point Y, and 234° C. at point Z. The temperature difference within the hot runner nozzle was 30° C.

Further, the weight dispersion of the resin molded product 50 created by the molding conditions illustrated in Table 1 was evaluated using a coefficient of variation. Polybutylene terephthalate was used as the resin. The coefficient of variation was calculated by 3 σ/AVE (%) using the standard deviation σ and the average value AVE. As a result of 20 shots, a was 0.08 g and AVE was 3.40 g, so that the coefficient of variation was 2.7%.

Example 7

In example 7, injection molding was performed using a hot runner nozzle including the nozzle N3 and the cover member C3, and temperature control was performed in a manner similar to example 1 to perform temperature measurement of respective portions.

As a result of the temperature measurement, the temperature was 260° C. at point W, 237° C. at point X, 260° C. at point Y, and 239° C. at point Z. The temperature difference within the hot runner nozzle was 23° C.

Further, the weight dispersion was evaluated similar to example 1. Polybutylene terephthalate was used as the resin. As a result of 20 shots, σ was 0.08 g and AVE was 3.54 g, so that the coefficient of variation was 2.3%.

Example 8

In example 8, evaluation using numerical analysis was performed for the cover member C3. In example 3 and example 7, as illustrated in FIG. 10B, the phase θ3 of the partial engagement portion on the outer periphery portion and the inner periphery portion of the cover member C3 was set to 60 degrees, but stationary heat analysis was performed of a case where the phase θ3 was varied. An injection mold including the nozzle N1 was the target of analysis, and parameters were adjusted so that the heat conductivity of the mold was 50 W/m·K and the heat conductivity of the hot runner nozzle was 20 W/m·K, the heat transfer coefficient of the water pipe was 20000 W/m2·K, and the temperature of control point W of the hot runner nozzle was 260° C.

Table 2 shows the analysis result of surface temperature of the partial engagement portions of the inner and outer periphery portions with θ3 varied between 0 and 60 degrees (every 10 degrees) and the temperature difference thereof. It shows that a greater effect of suppressing temperature drop of the hot runner nozzle is realized as the temperature difference between inner and outer partial engagement portions increases.

TABLE 2

| θ3 | PARTIAL ENGAGEMENT PORTION OF INNER PERIPHERY PORTION | PARTIAL ENGAGEMENT PORTION OF OUTER PERIPHERY PORTION | TEMPERATURE DIFFERENCE BETWEEN PARTIAL ENGAGEMENT PORTIONS OF INNER AND OUTER PERIPHERY PORTIONS |
|---|---|---|---|
| 0° | 173.7° C. | 95.7° C. | 78.0° C. |
| 10° | 176.5° C. | 89.8° C. | 86.7° C. |
| 20° | 177.0° C. | 83.7° C. | 93.3° C. |
| 30° | 178.8° C. | 78.3° C. | 100.5° C. |
| 40° | 179.4° C. | 74.1° C. | 105.3° C. |
| 50° | 175.8° C. | 70.9° C. | 104.9° C. |
| 60° | 176.5° C. | 70.7° C. | 105.8° C. |

As shown in Table 2, the temperature difference varies as the angle becomes greater where the θ3 is in the range from 0 to 30 degrees, but as for the range from 30 to 60 degrees, the temperature difference of 100° C. or greater has been achieved. Therefore, the effect of suppressing drop of nozzle temperature is significant when θ3 is 30 degrees or more and 60 degrees or less.

Comparative Example 1

Figure 11A:
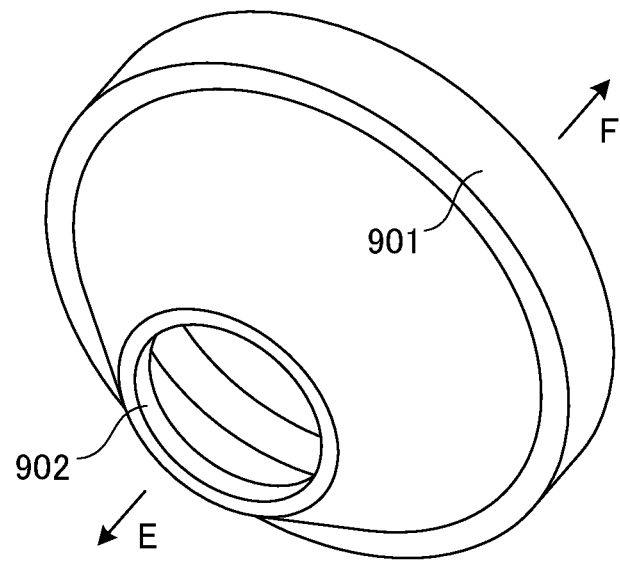
FIG. 11A is a schematic view of a cover member according to comparative example 1.
Figure 11B:
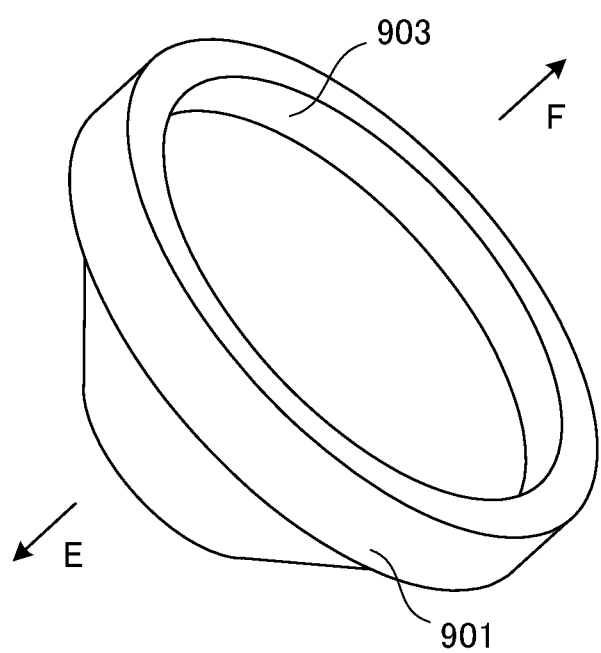
FIG. 11B is a schematic view illustrating the cover member according to comparative example 1 from another direction.

In comparative example 1, injection molding was performed using a hot runner nozzle including the nozzle N1 and a cover member, the outer shape of which is illustrated in FIGS. 11A and 11B, and temperature control was performed in a manner similar to example 1 to perform temperature measurement of respective portions.

According to the cover member of comparative example 1 is, as illustrated in FIGS. 11A and 11B, a gate-side engagement portion 902 is formed on an inner periphery portion on the gate side, a whole-circumference engagement portion 901 is formed on an outer periphery portion on the manifold side, and a whole-circumference engagement portion 903 is formed on an inner periphery portion on the manifold side.

Among these engagement portions, the whole-circumference engagement portion 901 and the whole-circumference engagement portion 903 on the manifold side must have relatively great lengths in the axial direction in order to improve the positioning accuracy. That is, the cover member of the comparative example does not include the partial engagement portion 301 of the cover member C1, or the partial engagement portion 801 of the cover member C3, of the examples, so that the axial length of the whole-circumference engagement portion 901 must be extended to increase the contact area with the mold. Similarly, the cover member of the comparative example does not include the partial engagement portion 403 of the cover member C2, or the partial engagement portion 806 of the cover member C3, of the examples, so that the axial length of the whole-circumference engagement portion 903 must be extended to increase the contact area with the nozzle body.

Temperature measurement was performed for comparative example 1, and the result was 260° C. at point W, 218° C. at point X, 282° C. at point Y, and 274° C. at point Z. The temperature difference within the hot runner nozzle was 70° C.

Weight dispersion was evaluated for comparative example 1 in a manner similar to example 1. Polybutylene terephthalate was used as the resin. As a result of 20 shots, σ was 0.3 g and AVE was 3.62 g, so that the coefficient of variation was 8.3%.

Results

The results of examples 1 to 7 and comparative example 1 are collectively shown in Table 3.

TABLE 3

| | TEMPERATURE DIFFERENCE WITHIN NOZZLE | WEIGHT DISPERSION | NOZZLE BODY DEFORMATION |
|---|---|---|---|
| EXAMPLE 1 | 46° C. | 4.3% | NONE |
| EXAMPLE 2 | 40° C. | 3.7% | NONE |
| EXAMPLE 3 | 36° C. | 3.4% | NONE |
| EXAMPLE 4 | 30° C. | 2.7% | BITE MARK |
| EXAMPLE 5 | 31° C. | 2.9% | BITE MARK |
| EXAMPLE 6 | 30° C. | 2.7% | NONE |
| EXAMPLE 7 | 23° C. | 2.3% | NONE |
| COMPARATIVE EXAMPLE 1 | 70° C. | 8.3% | NONE |

As shown in Table 3, the temperature difference within the nozzle and weight dispersion are significantly great in comparative example 1, whereas the weight dispersion and the temperature difference within the nozzle can both be significantly reduced by using the cover member of example 1.

Further, in examples 4 and 5 using the nozzle N2 adopting a structure where the whole circumference of the nozzle body is covered with nickel as a high heat conduction material, the heat of the heater can be transferred efficiently to the nozzle body, so that the temperature difference within the nozzle was reduced. There were cases where a difference in hardness between the cover member made of stainless steel having a high hardness and the outer layer portion of the nozzle body covered with nickel having a low hardness created a bite mark on the engagement portion of the nozzle body, but there was no problem regarding the function of the nozzle body since mechanical rigidity was ensured.

Further, according to examples 6 and 7, the engagement portion of the cover member was engaged to the rib portion of nozzle N3, but since both members were formed of stainless steel and therefore have the same hardness, no bite marks were formed, and the temperature difference within the nozzle was small.

As for the weight dispersion of the molded product, it should preferably be 3% or smaller for polybutylene terephthalate, so that in the case of polybutylene terephthalate, examples 6 and 7 are especially advantageous.

It can be recognized that the temperature difference within the nozzle is smaller according to the respective examples compared to comparative example 1. Therefore, the present invention can be preferably applied not only to a case where polybutylene terephthalate resin is used under the molding conditions shown in Table 1 but also to molding other engineering plastic-based resins having a small normal injection temperature range. Further, even if a general-purpose plastic resin is used, by applying the present invention to a multicavity mold in which multiple hot runner nozzles are arranged close to one another, a molded product having small weight dispersion, i.e., high shape uniformity, can be mass-produced. As for injection molding using an engineering plastic-based resin, a resin such as polyacetal or denaturated-Polyphenyleneether can be used. As for injection molding using a general-purpose plastic resin, a resin such as polystyrene, acrylonitrile-butadiene-styrene, or polycarbonate-acrylonitrile-butadiene-styrene alloy can be used. The molding conditions can be set arbitrarily according to the material, and the mold temperature can be preferably adjusted within the range of 30 to 80° C.

Modifications

The present disclosure is not limited to the embodiments and examples described above, and various modifications are made possible within the technical scope of the present disclosure.

For example, the shape of the cover member is not limited to the shapes illustrated in the descriptions of the embodiments. The cover member can be cylindrical, can adopt a shape integrated with the heater cover, or can be a shape of the engagement portion directly applied to the nozzle body. The width and axial length of the partial engagement portion is not limited to those illustrated above. The number and arrangement of the multiple partial engagement portions is not limited to those illustrated above, and the partial engagement portions can be arranged in line symmetry or point symmetry, or they can be arranged asymmetrically.

The present invention can be carried out preferably as a manufacture method of a resin molded product in which molten resin is injected to a cavity formed by a mold serving as space for molding the resin molded product through the hot runner nozzle described above. According to the manufacture method, resin molded products having small weight dispersion can be mass-produced.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-58416, filed Mar. 27, 2020, which is hereby incorporated by reference herein in its entirety.

What is claimed is:

1. A hot runner nozzle comprising:
a nozzle body configured to define a flow path of molten resin; and
a cover member arranged at a circumference of a tip portion of the nozzle body,
the cover member comprising a first engagement portion being arranged on a part of an outer periphery and configured to engage with a mold and/or a second engagement portion being arranged on a part of an inner periphery and configured to engage with the nozzle body,
wherein the first engagement portion is an opening or a protrusion and the second engagement portion is an opening or a protrusion.

2. The hot runner nozzle according to claim 1, wherein the cover member comprises an annular portion, and
an inner periphery of the annular portion is configured to abut against the nozzle body along an outer periphery of the nozzle body, and an outer periphery of the annular portion is configured to abut against the mold.

3. The hot runner nozzle according to claim 2, wherein the annular portion is configured to suppress leakage of molten resin that has been injected from the nozzle body but has not been injected into a cavity formed by the mold through a gap formed between the nozzle body and the mold.

4. The hot runner nozzle according to claim 1, further comprising:
a heater; and
an outer layer portion that is formed of a material having a higher heat conductivity than the nozzle body, the outer layer portion being configured integrally with the nozzle body and arranged between the nozzle body and the heater.

5. The hot runner nozzle according to claim 4, wherein the outer layer portion is configured to surround an outer periphery of the nozzle body annularly.

6. The hot runner nozzle according to claim 4, wherein the outer layer portion is provided at a part of an outer periphery of the nozzle body.

7. The hot runner nozzle according to claim 4, wherein a main component of the nozzle body is stainless steel, and a main component of the outer layer portion is any one of nickel, copper, and copper alloy.

8. The hot runner nozzle according to claim 1, wherein the hot runner nozzle comprises the first engagement portion and the second engagement portion, the first engagement portion and the second engagement portion being arranged such that they are not mutually overlapped when viewed in an axial direction of the nozzle body.

9. The hot runner nozzle according to claim 8, wherein the first engagement portion and the second engagement portion are arranged at mutually shifted positions within a range of 30 degrees to 60 degrees when viewed in the axial direction of the nozzle body.

10. An injection molding apparatus comprising:
the hot runner nozzle according to claim 1; and
a supply portion configured to supply molten resin to the nozzle body.

11. A manufacturing method of a resin molded product, comprising injecting molten resin into a cavity formed by the mold using the hot runner nozzle according to claim 1.

\* \* \* \* \*